United States Patent [19]
Gebregiorgis

[11] Patent Number: 5,116,903
[45] Date of Patent: * May 26, 1992

[54] PIGMENT DISPERSANT RESIN: REACTION PRODUCT OF IMIDAZOLINE AND ALKYLENE CARBONATE ADDUCT AND A HALF BLOCKED DIISOCYANATE

[75] Inventor: Taddesse Gebregiorgis, Sterling Heights, Mich.

[73] Assignee: E. I. du Pont de Nemours & Co., Wilmington, Del.

[*] Notice: The portion of the term of this patent subsequent to Aug. 7, 2007 has been disclaimed.

[21] Appl. No.: 681,567

[22] Filed: Apr. 5, 1991

[51] Int. Cl.$^5$ .................................................. C08K 3/22
[52] U.S. Cl. ........................... 524/589; 524/871; 528/45
[58] Field of Search ................. 524/589, 871; 528/45

[56] References Cited

U.S. PATENT DOCUMENTS

| | | | |
|---|---|---|---|
| 2,743,256 | 4/1956 | Groote | 260/45.1 |
| 2,771,434 | 11/1956 | Groote | 252/338 |
| 2,878,233 | 3/1959 | Harrison | 260/47 |
| 2,878,234 | 3/1959 | Peterson | 260/47 |
| 2,966,478 | 12/1960 | Harrison | 260/47 |
| 2,994,685 | 8/1961 | Glendale et al. | 260/47 |
| 3,002,941 | 10/1961 | Peterson | 260/18 |
| 3,168,491 | 2/1965 | Isaacs et al. | 260/31.6 |
| 3,234,155 | 2/1966 | Dearborn et al. | 260/18 |
| 3,335,105 | 8/1967 | Burnthall et al. | 260/29.2 |
| 3,474,056 | 10/1969 | Schneider et al. | 260/18 |
| 3,922,253 | 11/1975 | Jerabek et al. | 260/77.5 TB |
| 3,927,994 | 12/1975 | Romans | 44/63 |
| 3,927,995 | 12/1975 | Romans | 44/63 |
| 4,122,069 | 10/1978 | Meyer | 528/93 |
| 4,137,140 | 1/1979 | Belanger | 204/181 C |
| 4,155,824 | 5/1979 | Tsou | 204/181 |
| 4,246,394 | 1/1981 | Schulde et al. | 528/117 |
| 4,247,300 | 1/1981 | Bonazza et al. | 44/63 |
| 4,388,214 | 6/1983 | Oppenlaender et al. | 252/392 |
| 4,419,467 | 12/1983 | Wismer et al. | 523/414 |
| 4,468,307 | 8/1984 | Wismer et al. | 204/181 C |
| 4,479,855 | 10/1984 | Thoma et al. | 204/16 |
| 4,484,994 | 11/1984 | Jacobs, III et al. | 204/118 |
| 4,542,173 | 9/1985 | Schupp et al. | 523/414 |
| 4,543,376 | 9/1985 | Schupp et al. | 523/414 |
| 4,588,783 | 5/1986 | Chang | 525/329.9 |
| 4,710,561 | 12/1987 | Tominaga et al. | 528/111 |
| 4,946,507 | 8/1990 | Penge et al. | 523/400 |

FOREIGN PATENT DOCUMENTS 1235975 6/1971 United Kingdom .

Primary Examiner—Paul R. Michl
Assistant Examiner—Umakant Rajguru
Attorney, Agent, or Firm—Hilmar L. Fricke

[57] ABSTRACT

A pigment dispersant that is useful in a cathodic electrocoating composition is prepared by bringing into contact compound (i), an alkylene carbonate, with a compound (ii) of the structure:

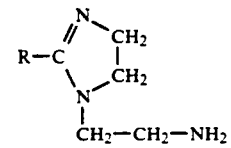

where R is and alkyl group having 8-24 carbon atoms, and bringing the resulting reaction product of (i) and (ii) into contact with a half blocked organic diisocyanate; this pigment dispersant has an advantage of allowing for the maximization of pigment to binder ratios and the minimization of volatile organic content (VOC) in electrocoating compositions.

8 Claims, No Drawings

PIGMENT DISPERSANT RESIN: REACTION PRODUCT OF IMIDAZOLINE AND ALKYLENE CARBONATE ADDUCT AND A HALF BLOCKED DIISOCYANATE

BACKGROUND OF THE INVENTION

This invention is related to pigment dispersant that is useful in a cationic electrocoating composition.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in an electrocoating bath of an aqueous emulsion of film-forming polymer and acts as an electrode in the electrodeposition process. An electric current is passed between the article and a counter-electrode in electrical contact with the aqueous emulsion, until a desired coating is produced on the article. In a cathodic electrocoating process, the article to be coated is the cathode and the counter-electrode is the anode.

Resin compositions used in a bath of a typical cathodic electrodeposition process also are well known in the art. These resins are typically made from polyepoxide resins which have been chain extended and then an adduct is formed to include amine groups in the resin. Amine groups typically are introduced through a reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode The article to be coated is the cathode and is passed through the tank containing the electrocoating bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions and resin compositions, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wilmer et al U.S. Pat. No. 4,468,307 issued Aug. 25, 1984.

Pigments are a necessary component in a typical eletrocoating automotive primer composition. Pigment dispersants are used to disperse the pigment in the composition and keep the pigment dispersed in the composition and thus are a very important part of any electrocoating composition. In the dispersion process, primary pigment particles are separated from agglomerates or aggregates of these particles; accluded air and absorbed water are displaced and the the surface of the pigment is coated with the pigment dispersant. Ideally, each primary particle which has been mechanically separated during the dispersion process, also is stabilized against flocculation. If the pigment particles are not properly dispersed and stabilized in the composition, the advantages built into the pigment by the manufacturer may be lost. For example, the pigment may settle in the electrodeposition bath which can result in loss of corrosion protection of the substrate. In addition, appearance of a film deposited by the electrodeposition process and the operating characteristics of an electrocoating bath may be adversely affected by inadequate pigment dispersion.

The better the pigment dispersant used in a coating composition or electrocoating bath, the less dispersant is required and the pigment to binder ratio can be increased in the composition. This can result in a savings on dispersant costs, improved processability, increased production capacity, and lower VOC (volatile organic concentration) in the coating or electrodeposition bath. Current commercial pigment dispersants used in cathodic electrocoating processes typically are polyepoxide resins containing either onium salts or amine salts. Using the pigment dispersants known in the prior art, the maximum pigment to binder ratio that can be obtained is 3:1. These pigment dispersants also require the use of solvents which raise the VOC of the electrocoating bath. Current commercial pigment dispersants contain at least 30 to 40% solvent.

What is needed is a pigment dispersant which will allow a maximum pigment to binder ratio, and minimize or eliminate the amount of solvent used in a typical electrocoating bath. This will result in a cost savings of dispersant, improved processability, and a lower VOC of the electrocoating bath.

SUMMARY OF THE INVENTION

A pigment dispersant that is useful in an electrocoating composition is prepared by bringing into contact compound (i), an alkylene carbonate, with a compound (ii) of the structure:

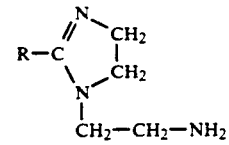

where R is and alkyl group having 8-24 carbon atoms, and bringing the resulting reaction product of (i) and (ii) into contact with a half blocked organic diisocyanate.

DETAILED DESCRIPTION OF THE INVENTION

By using the novel pigment dispersant in coating compositions and in particular in electrocoating compositions, higher pigment to binder weight ratios can be used. With the novel pigment dispersant, the pigment to binder ratio can be increased to 12:1 or higher which is a surprisingly unexpected four fold improvement over current commercial dispersants in which the pigment to binder ratio is about 3:1. In addition, the use of the novel pigment dispersant allows for the elimination of solvents in the coating composition which heretofore conventionally have been used.

In addition to the above, the novel pigment dispersant has the following advantages: (1) it is water dispersible when reacted with an organic acid, (2) the reaction of the imidazoline with the alkylene carbonate is rapid and there are essentially no side reactions, (3) it has a low viscosity, (4) it has excellent mechanical stability and will not break down in a typical pigment dispersion process and in an electrocoating bath and (5) it can be made completely soluble in water.

The novel pigment dispersant is not only useable in electrocoating compositions but is potentially usable in a variety of different coatings such as coatings applied by spraying, roller coating, dip coating, electrostatic spraying and the like. The pigment dispersant has been primarily developed for cathodic electrocoating applications and the remainder of the specification will be directed to these applications but this should not be interpreted to limit the scope of other potential applications for the novel pigment dispersant.

It is well known that most principal emulsions used in cathodic electrocoating baths have a binder resin which is an epoxy amine adduct blended with a cross-linking agent and neutralized with an acid to provide a water soluble product. The novel pigment dispersant is potentially usable with a variety of different cathodic electrocoating binder resins, but the preferred binder resin is the typical epoxy amine adduct of the prior art. These resins are disclosed in Wismer et al U.S. Pat. No.4,419,467 issued Dec. 6, 1983 which is incorporated herein by reference.

Likewise, the preferred crosslinker agents for the above-mentioned binder resins are also well known in the prior art. Typical useful crosslinking agents are aliphatic, cycloaliphatic and aromatic isocyanates such as hexamethylene diisocyanate, toluene diisocyanate, methylene diphenyl diisocyanate cyclohexamethylene diisocyanate and the like. These isocyanates are prereacted with a blocking agent such as oximes or alcohols which block the isocyanate functionality (i.e. the crosslinking functionality). Upon heating the blocking agents separate and crosslinking occurs. These crosslinking agents are disclosed in above '467 patent.

The epoxy amine adduct is neutralized with an acid to form a water dispersible cationic resin composition which also is well known in the art. The resulting cationic composition is combined with a pigment paste which is a blend of pigment and a pigment dispersant, crosslinking agent, water and additives such as anitcratering agents, plasticizers and the like to form an electrocoating bath.

The cationic resin composition and the crosslinking agent are the principal resinous ingredients in the principal emulsion used in an electrocoating bath and are usually present in amounts of about 30 to 50 percent by weight of solids.

In addition to the ingredients described above, electrocoating compositions contain pigment. Pigments which are used generally are made into a pigment paste which is then dispersed in the composition. The pigment paste is prepared by dispersing pigments using a typical dispersion process in the novel pigment dispersant along with optional additives such as wetting agents, surfactants, and defoamers. Typical dispersion processes that can be used are sand grinding, ball milling, attritor grinding and the like. After dispersion, the particle size of the pigment should be as small as practical, generally, a Hegman grinding gauge of about 6 to 8 is usually employed.

Typical pigments which can be used in the practice of this invention include titanium dioxide, basic lead silicate, strontium chromate, carbon black, iron oxide, clay and the like. These are the pigments generally used in automotive primers. The novel pigment dispersant is also potentially usable with organic pigments in primers, primer surfacers and topcoats.

The novel pigment dispersant is the reaction product of alkylene carbonate and a primary amine containing an imidazoline moiety. This reaction product is then reacted with a half blocked diisocyanate to form the pigment dispersant.

The most preferred alkylene carbonate is propylene carbonate. Another preferred aklylene carbonate is ethylene carbonate. Other useful alkylene carbonates include cyclic carbonates of the following structure:

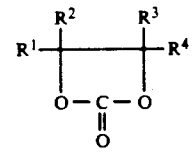

where $R^1$, $R^2$,1 $R^3$ and $R^4$ are each selected from the following group of hydrogen, methyl or ethyl.

The primary amine with the imidazoline moiety (hereinafter imidazoline amine) has the following structure:

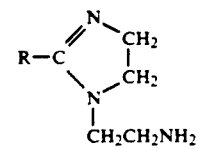

where R is $C_8$-$C_{24}$ alkyl and preferably is $C_{12}$-$C_{16}$ alkyl. This compound can be made by reacting an aliphatic mono-carboxylic acids of the formula:

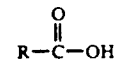

where R is defined as above with diethylenetriamine. The carboxylic acid is added slowly to the diethylenetriamine in the presence of a solvent to generate heat of neutralization. The resulting mixture is then heated under reflux conditions to 150°-160° C. until the water of condensation is removed. The solvent is removed under reduced pressure to give the final product (i.e. the imidazoline amine).

This imidazoline amine is then reacted with the alkylene carbonate to form a adduct having the formula:

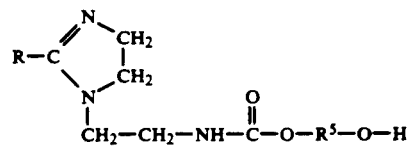

where R is defined above and $R^5$ is an alkylene group having 1-12 carbon atoms.

It is important to react the imidazoline amine with the alkylene carbonate in stoichemitric proportions. If there is excess imidazoline amine, the resulting dispersant will contain unreacted imidazoline amine which makes the final coating water sensitive and results in physical defects such as pinholes in a electrodeposited coating containing the dispersant. If there is excess of alkylene carbonate then there will likely be defects in the electrodeposited coating.

The reaction between the imidazoline amine and the alkylene carbonate takes place by slowly adding the alkylene carbonate to the imidazoline at temperature in range of about 40°-60° C. and allowing the exothermic reaction to increase the temperature to a range of about 65°-75° C. The reaction temperature is held within this range until a theoretical amine equivalent of about 369 is achieved (experimental amine equivalent weight of 373).

The resulting adduct is then reacted with a half blocked organic diisocyanate to form the novel pigment dispersant. Typically an exothermic reaction occurs and the reaction is held at a temperature of about 90°-110° C. until all of the isocyanate has reacted with the adduct to form the pigment dispersant of this invention.

Any of the aforementioned aromatic, aliphatic or cycloaliphatic diisocyanate can be used to form the half blocked organic diisocyanate. One particularly useful diisocyanate is 2,4 toluene diisocyanate. Monohydric alcohols having 1-12 carbon atoms can be used as a blocking agent for the diisocyanate. Preferred are monohydric alcohols having 6-12 carbon atoms. One particularly useful alcohol is 2-ethyl hexanol. The half blocked diisocyanate is formed by reacting the monohydric alcohol with the diisocyanate at about 40°-60° C. using only sufficient alcohol to block only half of the isocyanate groups of the diisocyanate.

The novel pigment dispersant has the following formula:

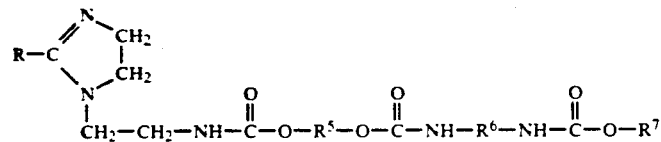

where R is an alkyl group that has 8-24 carbon atoms, $R^5$ is an alkylene group that has 1-12 carbon atoms, $R^6$ is either an alkylene group that has 1-12 carbon atoms, a divalent aromatic group or a divalent cycloaliphatic group and $R^7$ is an alkyl group that has 1-18 carbon atoms.

The reaction of the imidazoline amine and the alkylene carbonate and the subsequent reaction with the half blocked diisocyanate under the reaction conditions described above gives an essentially linear pigment dispersant with minimal side reactions. This dispersant is then neutralized with an acid in order to obtain a water dispersible or water soluble product. One preferred neutralization acid is lactic acid.

The pigment to binder weight ratio in the electrocoating composition and in the electrocoating bath is very important and should preferably be less than 50:100, more preferably less than 40:100 and is usually about 20 to 40:100. Higher pigment to binder ratios have been found to adversely affect coalescence and flow of deposited coatings. The pigment dispersant typically is used in the electrocoating composition at about 0.1-10% by weight, based on the weight of the binder.

The electrocoating compositions formed with the pigment dispersant of this invention can contain optional ingredients such as wetting agents, surfactants, defoamers and the like. Examples of surfactants and wetting agents include alkyl imidazolines such as those available from Ciba-Geigy Industrial Chemicals as Amine C®, acetylenic alcohols available from Air Products and Chemicals as Surfynol 104®. These optional ingredients, when present, constitute from about 0 to 20 percent by weight of binder solids. Plasticizers promote flow and also are optional ingredients and can be used in amounts of 0.1 to 15% by weight, based on the weight of the binder. Examples of typically useful plasticizers are high boiling water immiscible materials such as ethylene or propylene oxide adducts of nonyl phenols or bisphenol A.

Curing catalysts such as tin catalysts are usually added to the electrocoating composition. Examples are dibutyltin dilaurate and dibutyltin oxide. Amounts used are typically about 0.05 to 2 percent by weight tin based on weight of the binder.

The electrocoating compositions described herein are dispersions in aqueous medium. The term "dispersion" as used herein is believed to be a two-phase translucent or opaque aqueous resinous system in which the resin is in the dispersed phase and water in the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight binder solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

The following examples illustrate the invention. All parts and percentages unless otherwise indicated are by weight.

EXAMPLE

The following example discloses the preparation of the novel pigment dispersant, a pigment paste made from the dispersant and a cathodic electrocoat bath made from the pigment paste and a typical binder resin.

The binder used in the electrocoating bath is a basic amine epoxy adduct blended with a blocked isocyanate crosslinker and neutralized with an acid. These cathodic electodepositable binder resins are well known in the prior art. The particular binder used in this example is disclosed in Example 3 of U.S. Pat. No. 4,419,467 and will be referred to hereafter as the '467 binder resin.

In the preparation of the pigment dispersant an imidazoline amine is used that has the following formula:

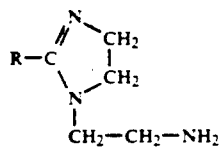

where R is $C_{12}$–$C_{14}$. This compound is hereinafter referred to as the "imidazoline amine" and is made as described previously in the specification.

Preparation of Imidazoline-Amine/Propylene Carbonate Adduct

This adduct was prepared from the following ingredients.

| Ingredients | Grams | Solids |
|---|---|---|
| Imidazoline amine | 2000 | 2000 |
| Propylene carbonate | 764 | 764 |

The imidazoline amine was charged into a reaction kettle and heated to 40° C. At 40° C., heating was stopped and propylene carbonate was added slowly. An exothermic reaction occurred and the temperature of the resulting reaction mixture was allowed to increase to 72° C. The reaction mixture was then held at 72° C. until a theoretical amine equivalent weight of 369 was obtained (experimental amine equivalent weight of 373). The reaction product had a solid content of 100%.

Preparation of a half capped organic diisocyanate 1 mole of 2,4 toluene diisocyanate are reacted with 1 mole of 2-ethyl hexanol at about 60° C. until all of the alcohol was reacted with the isocyanate.

Preparation of Imidazoline/propylene carbonate adduct with half capped toluene diisocyanate The following constituents were charged into a reaction vessel:

| Ingredients | Grams | Solids |
|---|---|---|
| Half capped organic diisocyanate | 200 | 186.8 |
| Imidazoline/propylene carbonate adduct | 226.6 | 226.6 |
| Methyl isobutyl ketone | 56.7 | . |

The half capped organic diisocyanate was charged into the reaction vessel and heated to about 66° C. under a blanket of nitrogen. Heating was stopped and the Imidazoline/propylene carbonate adduct was added slowly with the methyl isobutyl ketone. An exothermic reaction occurred and the temperature of the reaction mixture increased to 94° C. and then held at this temperature until all of the isocyanate was reacted which was determined by infrared analysis of the reaction mixture. The resulting reaction product had a solids content of 85.5%.

Preparation of the pigment dispersant solution 360 grams of the above reaction product was charged into a reaction vessel along with 45.3 grams of 88% lactic acid and heated to about 52° C. and 1147 grams of deionized water was slowly added. The resulting solution was slightly turbid and was held at about 52° C. for 60 minutes to form a clear solution. The methyl isobutyl ketone was vacuum stripped off and the resulting pigment dispersant solution had a solids content of 22.9% and a pH of 4.7.

Preparation of the pigment paste

A pigment paste was prepared from the following ingredients:

| Ingredients | Grams | Solids |
|---|---|---|
| Pigment dispersant solution (prepared above) | 167.98 | 22.9 |
| NOPCO NDW ® (defoamer) | 1.54 | |
| Clay | 57.97 | 57.97 |
| Lead silicate pigment | 24.88 | 24.88 |
| Carbon black pigment | 29.08 | 29.08 |
| TiO$_2$ pigment | 331.39 | 331.39 |
| Dibutyl tin oxide | 18.28 | 18.28 |
| Deionized water | 368.88 | |

The above ingredients were ground in zirconium media to a Hegman No. 7 to 7-¼. The paste had a 50.0% solids content and a pH of 7.64. The pigment to binder ratio was 12:1.

Preparation of a coating composition from the pigment paste

A cationic electrodeposition bath was prepared as follows:

| Ingredients | Grams |
|---|---|
| '467 binder resin | 1154.17 |
| Pigment paste (prepared above) | 180.54 |
| Deionized water | 1165.29 |

The deionized water was added to the '467 binder resin followed by the addition of the pigment paste. The resulting bath had a pH of 5.95, had a solids content of 20% and a pigment to binder ratio of 0.2/1.0.

Phosphated steel panels were electrodcoated in this bath at 220 volts for 135 seconds at a bath temperature of about 30° C. The wet films were baked at about 182° C. for 30 minutes to produce dry, smooth films having a film thickness of 1.24 mil. The cured film withstood 200 double rubs with methyl ethyl ketone.

We claim:

1. A pigment dispersant which is prepared by the following steps: bringing into contact compound (i), an alkylene carbonate, with a compound (ii) of the structure:

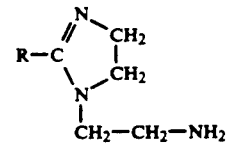

where R is an alkyl group having 8-24 carbon atoms, and bringing the resulting reaction product of (i) and (ii) into contact with a half blocked organic diisocyanate.

2. The pigment dispersant of claim 1 in which compounds (i) and (ii) are reacted stoichemitrically so that there is no excess of compounds (i) or (ii) and the reaction product is reacted stoichemitrically with the half blocked organic diisocyanate so that there is no excess of either the reaction product or the diisocyanate.

3. The pigment dispersant of claim 2 in which the alkylene carbonate is propylene carbonate.

4. The pigment dispersant of claim 2 in which R is an alkyl group having 12-16 carbon atoms.

5. The pigment dispersant of claim 2 in which the organic diisocyanate is an aromatic diisocyanate half blocked with a monohydric alcohol.

6. The pigment dispersant of claim 2 in which the alkylene carbonate is propylene carbonate, R is an alkyl group having 12-16 carbon atoms and the half blocked diisocyanate is toluene diisocyanate half blocked with a monohydric alcohol having 1-12 carbon atoms.

7. A pigment dispersant having the following formula:

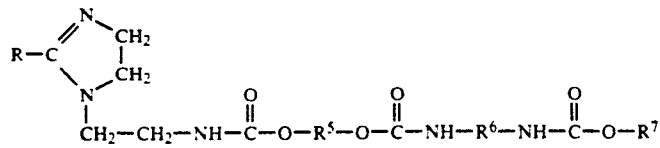

where R is an alkyl group that has 8-24 carbon atoms, $R^5$ is an alkylene group that has 1-12 carbon atoms, $R^6$ is either an alkylene group that has 1-12 carbon atoms, a divalent aromatic group or a divalent cycloaliphatic group and $R^7$ is an alkyl group that has 1-18 carbon atoms.

8. The pigment dispersant of claim 7 in which R is an alkyl group having 12-16 carbon atoms, $R^5$ is an alkylene group having 3 carbon atoms, $R^6$ is an arylene group and $R^7$ is an alkyl group having 6-12 carbon atoms.

* * * * *